United States Patent [19]

Trushenski

[11] 4,433,730
[45] Feb. 28, 1984

[54] OPTIMUM GRADING OF CHEMICAL CONCENTRATIONS IN A MICELLAR FLOOD

[75] Inventor: Scott P. Trushenski, Salt Lake City, Utah

[73] Assignee: Standard Oil Company, Chicago, Ill.

[21] Appl. No.: 248,739

[22] Filed: Mar. 30, 1981

[51] Int. Cl.$^3$ .............................................. E21B 43/22
[52] U.S. Cl. ..................................... 166/274; 166/273
[58] Field of Search ............ 166/273, 274, 275, 305 R

[56] References Cited

U.S. PATENT DOCUMENTS

| | | | |
|---|---|---|---|
| 3,348,611 | 10/1967 | Reisberg | 166/275 |
| 3,437,141 | 4/1969 | Brandner et al. | 166/273 |
| 3,476,184 | 11/1969 | Davis, Jr. | 166/275 X |
| 3,507,331 | 4/1970 | Jones | 166/274 X |
| 3,520,366 | 7/1970 | Jones | 166/274 X |
| 3,605,895 | 9/1971 | Jones | 166/273 |
| 3,827,499 | 8/1974 | Norton et al. | 166/274 X |
| 4,074,759 | 2/1978 | Boussaid | 166/273 |
| 4,099,569 | 7/1978 | Boussaid | 166/273 |
| 4,100,966 | 7/1978 | Boussaid | 166/273 |
| 4,232,737 | 11/1980 | Tyler et al. | 166/274 X |

OTHER PUBLICATIONS

Foster, "A Low-Tension Waterflooding Process", *Journal of Petroleum Technology, vol. 25, Feb. 1973, pp. 205–210.*

*Primary Examiner*—Stephen J. Novosad
*Assistant Examiner*—George A. Suchfield
*Attorney, Agent, or Firm*—Scott H. Brown; Fred E. Hook

[57] ABSTRACT

Any method for tertiary recovery of oil from an oil reservoir penetrated by injection and producing wells in which injected fluid, either the micellar or polymer bank, is formulated so that the front portion of the bank is miscible with oil and the rear portion is miscible with water. In one method of formulating the graded bank or banks, the salinity of the bank is graded from a high salinity at the front to a low salinity at the rear. Another method of formulating the bank, the cosurfactant concentration is graded from a low cosurfactant concentration at the front of the bank to a low concentration of surfactant at the rear.

12 Claims, No Drawings

OPTIMUM GRADING OF CHEMICAL CONCENTRATIONS IN A MICELLAR FLOOD

BACKGROUND OF THE INVENTION

1. Field of the Invention

The present invention relates to an improved method of micellar flooding and, more particularly, to such a method which utilizes optimum grading of the chemical concentrations in the injected fluid banks.

2. Setting of the Invention

After the oil production from a formation has declined below a certain production rate, some form of secondary and/or tertiary recovery method is often employed to recover the remaining inplace oil. One form of tertiary recovery method involves the injection of a micellar bank of fluid into the formation followed by the injection of a mobility control bank of fluid to displace the oil and water towards the production wells.

Most micellar fluids are miscible with both oil and water when initially injected in the formation. However, due to the relatively small size or quantity of the micellar bank, it degenerates and loses miscibility after moving a short distance within the formation. Once the micellar bank degenerates, the fluid becomes either miscible with oil but immiscible with water, immiscible with both oil and water, or it becomes miscible with water but immiscible with oil. When the micellar fluid bank becomes immiscible with both oil and water, then a significant portion of the oil will be trapped within the formation and nonrecoverable. Some operators prefer to have the bank miscible with oil and not with water because almost all of the inplace oil may be recovered. However, because the micellar bank is small compared to the following polymer bank, the micellar fluid would be immiscible with the polymer bank. In this case, the polymer bank traps the micellar fluid in the porous rock media. When all of the active solution in the micellar bank has been trapped, the micellar displacement of the oil is lost and no additional tertiary oil is mobilized. The trapping of the degenerated micellar bank by the polymer water can be eliminated if a water micellar miscible fluid is used. In this case, the active solution loss is much lower and the micellar bank propagation through the formation is much greater. However, this increased propagation is at the expense of the amount of oil displaced since this fluid is immiscible with oil, any fraction of the oil will remain in the porous rock media.

SUMMARY OF THE INVENTION

The present invention provides a novel method of oil recovery contemplated to overcome the foregoing disadvantages. The present invention is a method for recovery of oil from an oil formation which is penetrated by injection and producing wells. First, an aqueous micellar fluid bank is injected into the formation and secondly, a mobility control fluid bank, such as water with suspended polymer material, is injected into the formation to displace the oil to the producing wells. The improvement comprises grading the chemical concentrations within either the micellar bank or the mobility control bank, or grading the chemical concentration across the micellar bank and the mobility control bank whereby the leading edge of the respective micellar bank is miscible with oil and has a low interfacial tension with water, and the rear portion of the respective micellar bank or the last fluid bank is miscible with water and has a low interfacial tension with oil. This grading permits the maximum oil recovery from the formation with the least loss of surface active agent from the micellar bank.

DETAILED DESCRIPTION OF THE PREFERRED EMBODIMENTS

In micellar flooding, the micellar slug or bank contains a surfactant (surface active agent), such as a sulfonate, which has a tendency to degenerate and lose its miscibility after it has moved a relatively short distance within the formation. The degeneration is due primarily to mixing, adsorption, surfactant partitioning and surfactant fractionation. Once the micellar bank degenerates, one of the three following situations may occur:

(a) the bank becomes upper-phase, i.e., it is miscible with oil but immiscible with water, (b) the bank becomes middle-phase, i.e., it is miscible with both oil and water, or (c) the bank becomes lower-phase, i.e., it is miscible with water but immiscible with oil.

The above three degeneration situations prevent the maximum oil recovery from the formation. An optimal micellar bank would be miscible with oil at the leading edge and would be miscible with the polymer water at the trailing edge. This can be achieved by grading the chemical components in the injected banks.

Grading of injected fluid banks has been taught in the art and specifically mentioned in a paper by W. R. Foster entitled "A Low-Tension Waterflooding Process," Journal of Petroleum Technology, Vol. 25, February 1973, pages 205–210. This and other grading techniques have been used in the past but have taught the grading of the polymer concentration from a high at the oil interface to a low at the water interface in order to decrease the amount of polymers used and thereby decrease the cost of the flood operation.

A good example of one application of the concept of the present invention is the use of salinity contrast between the micellar and polymer banks. It has been found that as the salinity of a micellar fluid increases, its interfacial tension with oil decreases. The lower the interfacial tension the better the oil displacement efficiency. However, as the salinity of the micellar fluid increases, its interfacial tension with the water increases. The converse is also true. By reducing the salinity of the polymer bank to a value less than that of the micellar bank, the miscibility is achieved between the polymer water and the rear of the micellar bank. In this case, the leading edge of the micellar bank displaces all the oil miscibly, and the salinity gradient which develops between the miscellar bank and the polymer water due to mixing causes the micellar fluid to be displaced miscibly. Thus, the use of a salinity contrast between the micellar slug and polymer water bank insures that an optimal composition path is achieved and that the bank gradually traverses from an oil miscible regime to a water miscible regime. This results in maximum oil recovery and minimum chemical cost.

At present, when salinity contrast is used between the polymer and micellar slug, the change in salinity is a step function. At the same time, there is a step change in the surfactant and cosurfactant concentration. It may not be optimum to have these step changes in composition to occur at the same point. It may be more desirable to have a step change in composition within the micellar bank or within the polymer bank. It may also be desirable to gradually change the salinity from a high value near the leading edge of the micellar bank to a low value near the back edge. Various schemes of changing salinity can be conceived. Linear changes, geometric, exponential, and logarithmic changes can be introduced at various points during the flood. The concent here is to introduce a controlled salinity gradient to maintain miscible displacement.

Salinity contrast (or grading) is just one method which can be used to maintain miscible displacement of oil at the leading edge of the micellar bank and the miscible displacement of the micellar fluid by the polymer water bank at the rear. The techniques listed below will insure that (1) the leading edge of the micellar bank is miscible with oil and has a low interfacial tension with water and (2) the rear of the micellar bank is miscible with polymer water and has a high interfacial tension with oil:

1. Grading from a high salinity (200,000 ppm TDS—2,000 ppm TDS) to a low salinity (30,000 ppm TDS—2,000 ppm TDS).

2. Grading from a low concentration (6%–0%) of water-soluble alcohol (i.e., methanol IPA, butanol, ethoxylated alcohols), to a high concentration (10%–1%) of water-soluble alcohol.

3. Grading from a high concentration (10%–0.03%) of oil-soluble alcohol (amyl alcohol, hexal alcohol) to a low concentration of oil soluble alcohol (5–0%).

4. Grading from a low concentration (3%–0%) of low equivalent weight sulfonates (200–380 EW) to a high concentration (6%–0.5%) of low equivalent weight sulfonates. These low equivalent weight sulfonates include green acid sulfonates, lignosulfonates, and synthetic sulfonates.

5. Grading from a high concentration (6%–0.5%) of high equivalent weight sulfonates (EW J380) to a low concentration (3%–0%) of high equivalent weight sulfonates.

Grading of any of these materials listed above can be accomplished singly or in any combination thereof. If two or more of the above schemes are used, the gradation does not have to occur in the same region. In addition, the gradation can be accomplished using many schemes: a single step change in composition, multiple steps, a linear change in the concentration, exponential, logarithmic, or any combination of the above. The grading can occur entirely within the micellar slug, within the polymer bank, or within the preflush bank ahead of the micellar slug. As mentioned previously, grading may occur throughout the preflush, micellar and polymer banks, between the preflush and micellar banks, or between the micellar and polymer banks.

Whereas, the present invention has been described in particular relation to the wording hereto, it should be understood that other and further modifications, apart from those shown or suggested herein, may be made within the scope and spirit of this invention.

What is claimed is:

1. In a method for displacing oil through an oil bearing formation penetrated by injection and producing wells, the improvement comprising:
   (a) injecting an aqueous micellar fluid bank into the formation through the injection well, and
   (b) injecting a mobility control fluid bank into the formation through the injection well to displace the oil to the producing wells, whereby the composition of the micellar and mobility control fluid banks are graded such that the leading edge of the micellar bank is miscible with oil and the rear portion of the mobility control fluid bank is miscible with water.

7. In a method for displacing oil through an oil bearing formation penetrated by injection and producing wells, the improvement comprising:
   (a) injecting a graded aqueous micellar fluid bank into the formation through the injection well, wherein the micellar fluid is graded from a low concentration of low equivalent weight sulfonates to a high concentration of low equivalent weight sulfonates, such that a leading edge of the micellar bank is miscible with oil and a rear portion of the micellar bank is miscible with water, and
   (b) injecting a mobility control fluid into the formation to displace the oil to the producing wells.

8. In a method for displacing oil through an oil bearing formation penetrated by injection and producing wells, the improvement comprising:
   (a) injecting a graded aqueous micellar fluid into the formation through the injection well, wherein the micellar fluid is graded from a high concentration at high equivalent weight sulfonate to a low concentration of high equivalent weight sulfonate, such that a leading edge of the micellar bank is miscible with oil and a rear portion of the micellar bank is miscible with water, and
   (b) injecting a mobility control fluid into the formation through the injection well to displace the oil to the producing wells.

9. In a method for displacing oil through an oil bearing formation penetrated by injection and production wells, the improvement comprising injecting continuously graded micellar and mobility control fluid banks into the formation through the injection well, wherein the miscibility of the micellar and mobility control fluid banks is continuously graded from a leading of the micellar bank through the micellar and mobility control fluid bank into a rear portion of the mobility control fluid bank, such that the leading edge of the micellar bank is miscible with oil and the rear portion of the mobility control fluid bank is miscible with water.

10. In a method for displacing oil through an oil bearing formation penetrated by injection and producing wells, the improvement comprising:
   (a) injecting an aqueous micellar fluid bank into the formation through the injection well, and
   (b) injecting a graded mobility control fluid into the formation through the injection well to displace the oil to the producing wells, wherein the graded fluid is graded from a low concentration of water-soluble alcohol to a high concentration of water-soluble alcohol such that the leading edge of the mobility control bank is miscible with oil and the rear portion of the mobility control fluid bank is miscible with water.

11. In a method for displacing oil through an oil bearing formation penetrated by injection and producing wells, the improvement comprising:
   (a) injecting an aqueous micellar fluid bank into the formation through the injection well, and
   (b) injecting a graded mobility control fluid into the formation through the injection well to displace the oil to the producing wells, wherein the graded fluid is graded from a low concentration of low equivalent weight sulfonates to a high concentration of low equivalent weight sulfonates such that the leading edge of the mobility control fluid bank is miscible with oil and the rear portion of a mobility control fluid bank is miscible with water.

12. In a method for displacing oil through an oil bearing formation penetrated by injection and producing wells, the improvement comprising:
(a) injecting an aqueous micellar fluid bank into the formation through the injection well, and
(b) injecting a graded mobility control fluid into the formation through the injection well to displace the oil to the producing wells, wherein the graded fluid is graded from a high concentration of high equivalent weight sulfonates to a low concentration of high equivalent weight sulfonates such that the leading edge of the mobility control fluid bank is miscible with oil and the rear portion of a mobility control fluid bank is miscible with water.

* * * * *

UNITED STATES PATENT OFFICE
CERTIFICATE OF CORRECTION

PATENT NO. : 4,433,730

DATED : February 28, 1984

INVENTOR(S) : Scott P. Trushenski

It is certified that error appears in the above-identified patent and that said Letters Patent are hereby corrected as shown below:

Column 3, line 5, "concent" should be --concept--;

Claims 2-6 are missing; therefore, Claims 2-6 should be inserted as follows:

--2. The method of Claim 1 wherein said micellar fluid bank and said mobility control fluid bank are graded from a high salinity to a low salinity.

3. The method of Claim 1 wherein the graded fluids are graded from a low concentration of water-soluble alcohol to a high concentration of water-soluble alcohol.

4. The method of Claim 1 wherein the graded fluids are graded from a high concentration of oil-soluble alcohol to a low concentration of oil-soluble alcohol.

UNITED STATES PATENT OFFICE
CERTIFICATE OF CORRECTION

PATENT NO. : 4,433,730
DATED : February 28, 1984
INVENTOR(S) : Scott P. Trushenski It is certified that error appears in the above-identified patent and that said Letters Patent are hereby corrected as shown below:

5. The method of Claim 1 wherein the graded fluids are graded from a low concentration of low equivalent weight sulfonates to a high concentration of low equivalent sulfonates.

6. The method of Claim 1 wherein the graded fluids are graded from a high concentration of high equivalent weight sulfonates to a low concentration of high equivalent weight sulfonates.--

Signed and Sealed this

Nineteenth Day of February 1985

[SEAL]

Attest:

DONALD J. QUIGG

Attesting Officer

Acting Commissioner of Patents and Trademarks